(12) United States Patent
Jenne et al.

(10) Patent No.: US 9,965,289 B2
(45) Date of Patent: *May 8, 2018

(54) SYSTEMS AND METHODS FOR REAL-TIME CACHE FLUSH MEASUREMENTS IN AN INFORMATION HANDLING SYSTEM

(71) Applicant: Dell Products L.P., Round Rock, TX (US)

(72) Inventors: John Erven Jenne, Austin, TX (US); Stuart Allen Berke, Austin, TX (US); Dit Charoen, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 180 days.

This patent is subject to a terminal disclaimer.

(21) Appl. No.: 14/832,890

(22) Filed: Aug. 21, 2015

(65) Prior Publication Data

US 2017/0052791 A1 Feb. 23, 2017

(51) Int. Cl.
| | | |
|---|---|---|
| *G06F 9/44* | (2018.01) | |
| *G06F 11/30* | (2006.01) | |
| *G06F 12/0808* | (2016.01) | |
| *G06F 12/0804* | (2016.01) | |

(52) U.S. Cl.
CPC ........ *G06F 9/4403* (2013.01); *G06F 11/3037* (2013.01); *G06F 11/3062* (2013.01); *G06F 12/0804* (2013.01); *G06F 12/0808* (2013.01); *G06F 2201/885* (2013.01); *G06F 2212/1028* (2013.01); *G06F 2212/601* (2013.01); *Y02D 10/13* (2018.01)

(58) Field of Classification Search
CPC ............ G06F 11/3037; G06F 11/3062; G06F 12/0804; G06F 12/0808; G06F 2201/885; G06F 2212/1028; G06F 2212/601; G06F 9/4403
See application file for complete search history.

(56) References Cited

U.S. PATENT DOCUMENTS

| | | | | |
|---|---|---|---|---|
| 6,052,789 A * | 4/2000 | Lin | ....................... | G06F 1/3203 365/229 |
| 7,725,653 B2 * | 5/2010 | Long | .................... | G06F 11/1441 711/118 |
| 8,762,643 B2 * | 6/2014 | Ishii | ..................... | G06F 12/0866 711/118 |
| 9,003,118 B2 * | 4/2015 | Cherian | .............. | G06F 12/0804 711/103 |
| 2006/0080515 A1* | 4/2006 | Spiers | ................. | G06F 11/1441 711/162 |

(Continued)

*Primary Examiner* — Fahmida Rahman
(74) *Attorney, Agent, or Firm* — Jackson Walker L.L.P.

(57) ABSTRACT

In accordance with embodiments of the present disclosure, a method may include, during boot of an information handling system, determining a first amount of energy required by the information handling system to flush a cache integral to the information handling system to memory integral to the information handling system in response to a power loss of one or more power supplies for supplying electrical energy to the information handling system, determining whether a second amount of energy available for hold-up of one or more power supplies in response to the power loss exceeds the first amount of energy, and responsive to determining whether the second amount of energy exceeds the first amount of energy, configuring the cache.

12 Claims, 2 Drawing Sheets

(56) References Cited

U.S. PATENT DOCUMENTS

| | | | |
|---|---|---|---|
| 2009/0031072 A1* | 1/2009 | Sartore | G06F 12/0638 |
| | | | 711/102 |
| 2010/0005285 A1* | 1/2010 | Yun | G06F 1/1616 |
| | | | 713/2 |
| 2016/0259649 A1* | 9/2016 | Poornachandran | G06F 1/3203 |
| 2017/0052716 A1* | 2/2017 | Jenne | G06F 3/0604 |
| 2017/0052794 A1* | 2/2017 | Berke | G06F 9/4406 |

* cited by examiner

SYSTEMS AND METHODS FOR REAL-TIME CACHE FLUSH MEASUREMENTS IN AN INFORMATION HANDLING SYSTEM

TECHNICAL FIELD

The present disclosure relates in general to information handling systems, and more particularly to systems and methods for providing real-time cache flush measurements in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include one or more power supply units for providing electrical energy to components of the information handling system. Typically, a power supply unit is configured to operate from an input alternating current (AC) source of electrical energy, which the power supply unit converts to a direct current (DC) output. Thus, typically a power supply unit may include a rectifier and/or power factor correction stage to receive the input AC source and rectify the input AC waveform to charge a bulk capacitor to a desired voltage. A direct-current-to-direct-current (DC-DC) stage may convert the voltage on the bulk capacitor to a DC output voltage which may be used to power components of the information handling system. Other PSUs may be powered from a DC input source (e.g., a 48-volt DC input), and such PSUs may comprise a DC-DC converter for converting voltage to a desired level.

In traditional approaches, a power supply unit may be capable of, immediately after removal of the AC source to the power supply unit, providing electrical energy at its output for a period of time using the stored charge on the bulk capacitor to provide an output direct-current voltage. Such a period of time is limited, of course, as once the alternating current input is not available, the bulk capacitor will discharge and the power supply unit will shut down.

As illustrated in FIG. 1, one portion of this period of time is known as a ride-through time $T_{rt}$ and represents a period of time for which the power supply unit continues to generate a direct current output while waiting for reapplication of the AC source. If the AC source is not reapplied within the ride-through time, the available stored energy on the bulk capacitor may fall below a threshold, and the power supply unit may de-assert a signal (e.g., BULK_OK). The de-assertion of the BULK_OK signal signifies entry into a period known as the hold-up time $T_{up}$ in which the information handling system may use additional energy remaining stored within the bulk capacitor to power components such that components may complete tasks before the power supply unit is no longer able to provide an adequate direct current output voltage (as indicated by signal DC_OK in FIG. 1 de-asserting). For example, in response to an impending shutdown resulting from loss of alternating current input to a power supply unit, a write-back cache may flush data to a non-volatile memory, and the hold-up time may provide sufficient time for the write-back cache to use available electrical energy from the power supply unit in order to complete the cache flush before the power supply unit ceases generating an output voltage as a result of the withdrawal of the input alternating-current waveform. After the hold-up time has expired, the power supply unit may terminate its DC output in an orderly shutdown procedure. As noted above, in some information handling systems, instead of an AC input source, a DC input source may be used. In such instances, similar hold-up time mechanisms and timings may be provided.

In many information handling system which provide main memory as persistent memory (e.g., non-volatile dual-inline memory modules), the cache or the address range of the persistent memory region cannot be configured as write-back due to the fact that the time required to flush "dirty" cache lines from the cache to memory may be greater than the system hold-up provided. In such cases, the cache or the address range of the persistent memory region may be configured in a lower performance write-through mode. Accordingly, such systems may sacrifice performance as an expense of having persistent memory. For highest performance of persistent memory, is may be desirable to be able to enable write-back caching during system runtime.

SUMMARY

In accordance with the teachings of the present disclosure, the disadvantages and problems associated with existing approaches to enabling write-back caching with a persistent memory in an information handling system may be reduced or eliminated.

In accordance with embodiments of the present disclosure, an information handling system may include a processor, a management controller communicatively coupled to the processor, and a basic input/output system comprising a program of instructions executable by the processor. The basic/input output system may be configured to, during boot of the information handling system, initialize information handling resources of the information handling system for interoperability with the processor, and in concert with the management controller: (i) determine a first amount of energy required by the information handling system to flush a cache integral to the information handling system to memory integral to the information handling system in response to a power loss of one or more power supplies for supplying electrical energy to the information handling system, (ii) determine whether a second amount of energy available for hold-up of one or more power supplies in response to the power loss exceeds the first amount of energy, and (iii) responsive to determining whether the second amount of energy exceeds the first amount of energy, configure the cache.

In accordance with these and other embodiments of the present disclosure, a method may include, during boot of an information handling system, determining a first amount of energy required by the information handling system to flush a cache integral to the information handling system to memory integral to the information handling system in response to a power loss of one or more power supplies for supplying electrical energy to the information handling system, determining whether a second amount of energy available for hold-up of one or more power supplies in response to the power loss exceeds the first amount of energy, and responsive to determining whether the second amount of energy exceeds the first amount of energy, configuring the cache.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to, during boot of an information handling system and in concert with a management controller of the information handling system: (i) determine a first amount of energy required by the information handling system to flush a cache integral to the information handling system to memory integral to the information handling system in response to a power loss of one or more power supplies for supplying electrical energy to the information handling system, determine whether a second amount of energy available for hold-up of one or more power supplies in response to the power loss exceeds the first amount of energy, and responsive to determining whether the second amount of energy exceeds the first amount of energy, configure the cache.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
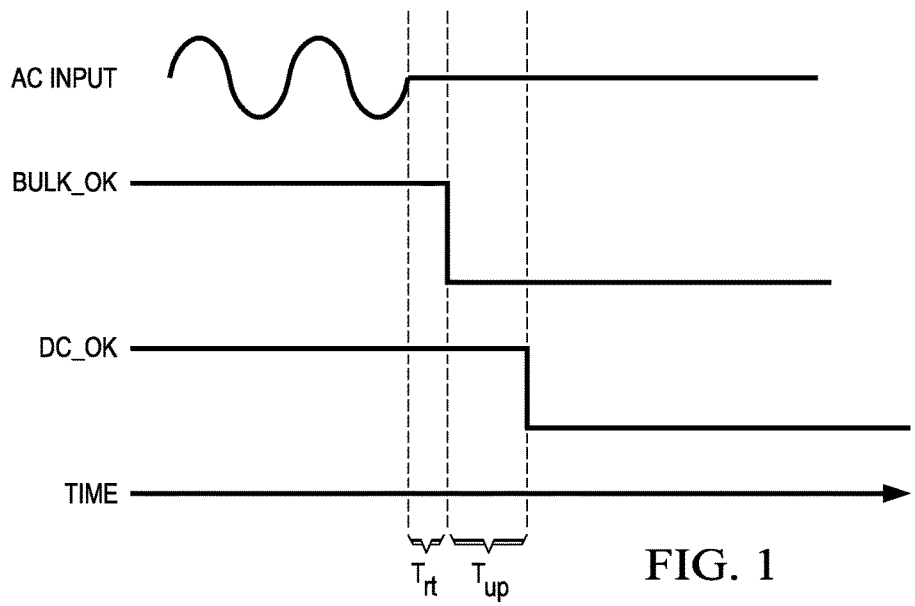
FIG. 1 illustrates a timing diagram depicting the occurrence of ride-through time and hold-up time in an information handling system, as is known in the art.
Figure 2:
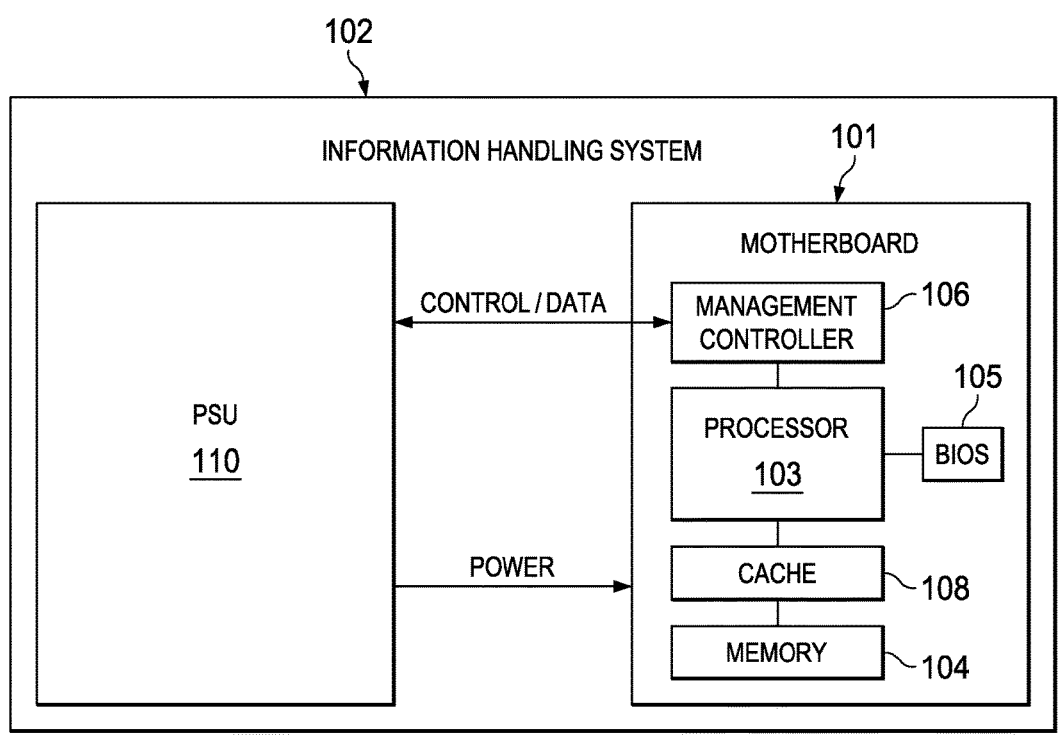
FIG. 2 illustrates a block diagram of an example information handling system, in accordance with embodiments of the present disclosure.
Figure 3:
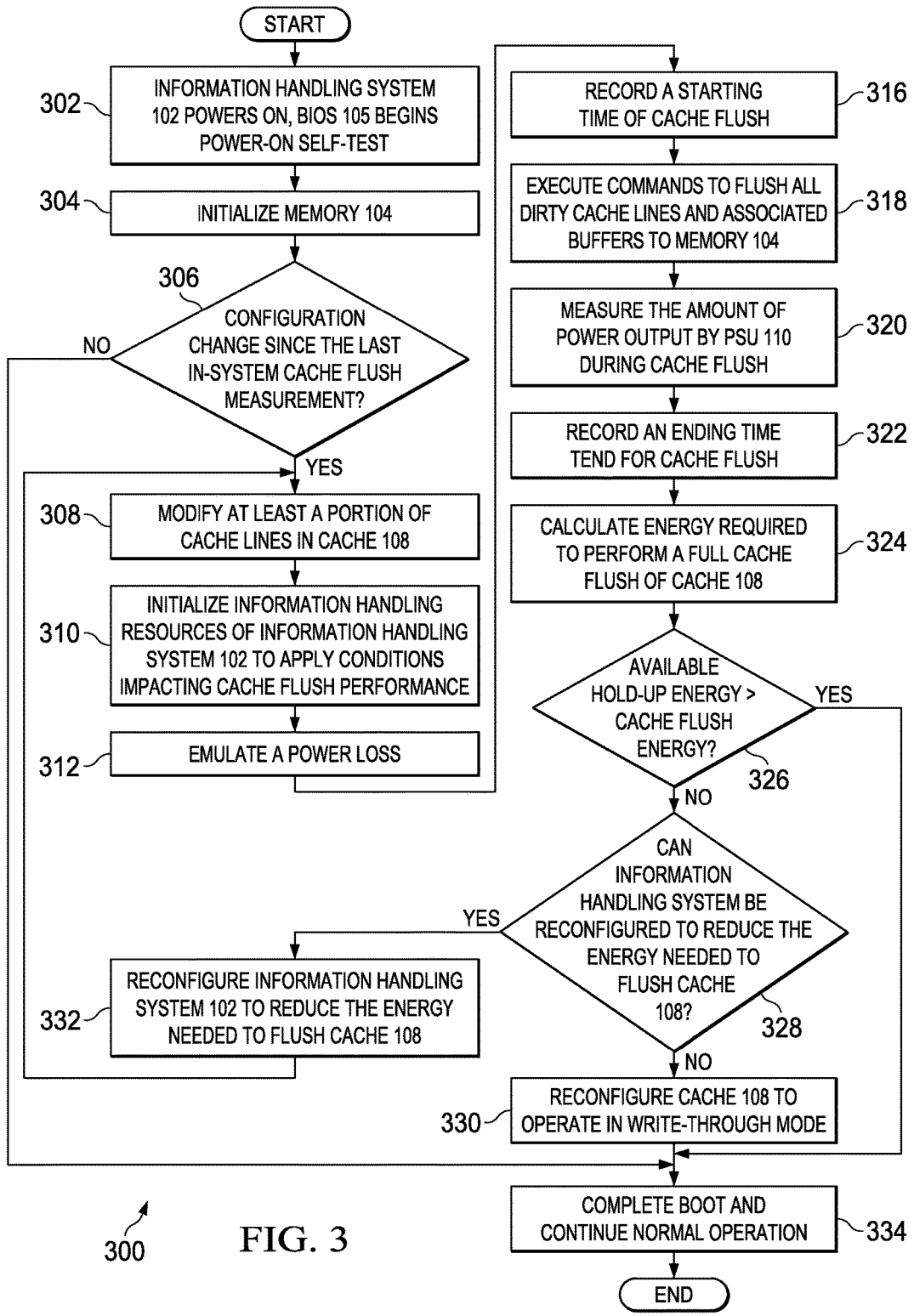
FIG. 3 illustrates a flow chart of an example method for setting real-time cache flush measurements in an information handling system, in accordance with embodiments of the present disclosure.

Preferred embodiments and their advantages are best understood by reference to FIGS. 2 and 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

FIG. 2 illustrates a block diagram of an example of an information handling system 102. As depicted, information handling system 102 may include a power supply unit (PSU) 110, a motherboard 101, and one or more other information handling resources.

Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 2, motherboard 101 may include a processor 103, memory 104, a BIOS 105, a management controller 106, a processor cache 108, and one or more other information handling resources.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off. In particular embodiments, memory 104 may comprise a non-volatile memory (e.g., comprising one or more non-volatile dual-inline memory modules).

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102. In some embodiments, BIOS 105 may also be configured to, alone or in concert with management controller 106, perform real-time cache flush measurements for flushing cache 108 or a portion thereof to memory 104, as described in greater detail below.

Management controller 106 may be configured to provide out-of-band management facilities for management of information handling system 102. Such management may be made by management controller 106 even if information handling system 102 is powered off or powered to a standby state. Management controller 106 may include a processor, memory, an out-of-band network interface separate from and physically isolated from an in-band network interface of information handling system 102, and/or other embedded information handling resources. In certain embodiments, management controller 106 may include or may be an integral part of a baseboard management controller (BMC) or a remote access controller (e.g., a Dell Remote Access Controller or Integrated Dell Remote Access Controller). In other embodiments, management controller 106 may include or may be an integral part of a chassis management controller (CMC). In some embodiments, management controller 106 may be configured to communicate with a PSU 110 to communicate control and/or telemetry data between management controller 106 and PSU 110. For example, PSU 110 may communicate information regarding status and/or health of PSU 110 and/or measurements of electrical parameters (e.g., electrical currents or voltages) present within PSU 110. In some embodiments, management controller 106 may also be configured to, alone or in concert with BIOS 105, perform real-time cache flush measurements for flushing cache 108 or a portion thereof to memory 104.

Cache 108 may comprise a memory used by processor 103 to reduce the average time to access data from main memory 104. Cache 108 may be a smaller, faster memory than memory 104 and may store copies of frequently-used data and instructions from memory 104. In some embodiments, cache 108 may comprise an independent data cache and instruction cache. In these and other embodiments, a cache may be organized in a hierarchy of multiple cache levels (e.g., level 1, level 2, etc.). In these and other embodiments, caches levels within the hierarchy may be inclusive or exclusive. All or part of cache 108 may be configured as a write-back cache, in which processor 103 writes may be stored in cache 108 without also writing the data to memory 104, until a subsequent action such as cache line invalidate or flush operation forces the data to be written back to memory 104. Thus in write-back cache, the most up-to-date copy of the data may only reside in cache 108 indefinitely. Some part of cache 108 may also be configured as a write-through cache, in which processor 103 writes are stored in cache but also immediately to memory 104 such that the memory 104 has the most up-to-date copy of the data. In some embodiments, rather than configuring cache 108 itself, the cacheability of mutually-exclusive memory address ranges may be designated as write-back, write-through, or un-cacheable by having the BIOS 105 or an operating system mark the associated page tables for the address ranges of memory 104 accordingly during memory allocation. Reads from or writes to un-cacheable address ranges may not be stored in cache 108.

Generally speaking, PSU 110 may include any system, device, or apparatus configured to supply electrical current to one or more information handling resources of information handling system 102. PSU 110 may convert external AC or DC input voltage supplied to information handling system 102 into one or more power rails required for operation of motherboard 101.

In addition to motherboard 101, processor 103, memory 104, BIOS 105, management controller 106, cache 108, and PSU 110, information handling system 102 may include one or more other information handling resources. For example, in some embodiments, information handling system 102 may include more than one PSU 110.

FIG. 3 illustrates a flow chart of an example method 300 for setting real-time cache flush measurements in an information handling system, in accordance with embodiments of the present disclosure. According to some embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, information handling system 102 may power-on and BIOS 105 may begin a power-on self-test. At step 304, BIOS 105 or management controller 106 may initialize memory 104. In some embodiments, the cache or the memory address range to be used for the cache flush measurement may need to be initialized/configured as write-back. At step 306, BIOS 105 or management controller 106 may determine if a configuration for information handling system 102 has changed since the last in-system cache flush measurement. If the configuration for information handling system 102 has changed since the last in-system cache flush measurement, method 300 may proceed to step 308. Otherwise, if the configuration for information handling system 102 is unchanged since the last in-system cache flush measurement, method 300 may proceed to step 334.

At step 308, BIOS 105 and/or management controller 106 may begin an in-system cache flush measurement process by modifying at least a portion of cache lines in cache 108 to render such cache lines "dirty" (commonly known as "Modified") in preparation of them being flushed to memory 104. In some embodiments, CPU-privileged instructions may be executed on a per cache line basis to change or affect a change of the coherency state (e.g., in MESI Protocol: Modified, Exclusive, Shared, Invalidated) directly. These instructions may include cache line Invalidate or Evict or Flush instructions. In some embodiments, where CPU-privileged instructions are not available to alter cache coherency states, or instructions are not available to Evict or Invalidate or Flush cache lines, it may be necessary to systematically perform a sequence of memory writes or other transactions in order to set each cache line to the "dirty" state (e.g., where cache 108 has the only latest copy of the data to be written back to memory 104). In some embodiments, it may be necessary or advantageous to take into consideration the cache line replacement policy of cache 108, such as a least recently-used (LRU) algorithm that evicts older cache lines to make room for newly-written cache lines.

In some embodiments, modifying all of the cache lines may not be possible, as portions of BIOS 105 code may be present in cache 108 and it may be undesirable to evict BIOS 105 code from cache 108. In these or other embodiments, BIOS 105 may not have direct control of or knowledge of what may be resident in all or a portion of the cache. Thus, in some embodiments it may be sufficient to modify a fraction of the cache lines and characterize a cache flush using such fraction of the cache lines and extrapolate energy required for a complete cache flush of all lines based on flush operations on the fraction of modified cache lines. As a specific example, one-fourth of cache lines may be modified, and the overall energy needed to flush all cache lines may be estimated as four times that needed to flush such one-fourth of cache lines.

At step 310, BIOS 105 and/or management controller 106 may initialize information handling resources of information handling system 102 to apply conditions that would impact cache flush performance. Such conditions may include, without limitations, a user- or system-specified system input power maximum limit, open-loop or closed-loop thermal throttling that may occur during system operation over varying operating temperatures and system workloads, thermal power capping limitations on various component and subsystems within information handling system 102, etc. In some embodiments, the conditions applied may support characterization of worst-case cache flush measurements. At step 312, management controller 106 may emulate a power loss while leaving information handling system 102 powered on.

At step 316, BIOS 105 may record a starting time $t_{start}$ of a cache flush of the dirty cache lines to memory 104. At step 318, BIOS 105 may execute commands to flush all dirty cache lines and associated buffers to memory 104. At step 320, during such cache flush, management controller 106 may measure the amount of power $P_{flush}$ output by PSU 110. At step 322, upon completion of the cache flush, BIOS 105 may record an ending time $t_{end}$ for the cache flush. At step 324, management controller 106 may calculate the energy required to perform a full cache flush of cache 108. For example, such energy $E_{flush}$ may be given by $E_{flush} = N \times P_{flush} \times (t_{end} - t_{start})$ where N is a constant based on a fraction of the cache lines of cache 108 flushed (e.g., N=1 if all cache lines flushed, N=4 if one-fourth of cache lines flushed).

In alternative embodiments, steps 316, 320, 322, and 324 may be replaced by a procedure to determine the energy consumption during the cache flush by recording an energy counter of PSU 110 at the start and at the end of a cache flush and, if the cache flush was partial, adjust accordingly for full flush.

At step 326, management controller 106 may determine whether the energy $E_{flush}$ is smaller than an available hold-up energy $E_{hold-up}$. For example, the available hold-up energy may be given by $E_{hold-up} = C(V_{max}^2 - V_{min}^2)/2$ where C is a capacitance of a bulk capacitor of PSU 110, $V_{max}$ equals a voltage of such bulk capacitor at the start of the hold-up period, and $V_{min}$ equals the voltage of such bulk capacitor at the end of the hold-up period. If the available hold-up energy $E_{hold-up}$ exceeds the energy $E_{flush}$ needed to flush cache 108, cache 108 or the desired memory address range may remain configured as write back and method 300 may proceed to 334. Otherwise, method 300 may proceed to step 328.

At step 328, in response to a determination that the energy $E_{flush}$ needed to flush cache 108 exceeds available hold-up energy $E_{hold-up}$, BIOS 105 and/or management controller 106 may determine if information handling system 102 may be reconfigured to reduce the energy $E_{flush}$ needed to flush cache 108. Reconfiguration may include modification of write-back cache size, modification of write-back cacheable memory address ranges, modification of allowable memory modes (e.g., allowable error correction code modes), reduced throttling levels of information handling resources of information handling system 102, and/or other reconfigurations. If information handling system 102 may be reconfigured to reduce the energy $E_{flush}$ needed to flush cache 108, method 300 may proceed to step 332. Otherwise, method 300 may proceed to step 330.

At step 330, in response to a determination that information handling system 102 may not be reconfigured to reduce the energy $E_{flush}$ needed to flush cache 108, BIOS 105 may reconfigure cache 108 to operate in write-through mode. In some embodiments, instead of reconfiguring the cache, BIOS 105 may instead reconfigure the cacheability of the memory address range of interest to operate in write-through mode. In some embodiments, BIOS 105 may also provide an alert to a user of information handling system 102 that cache 108 or the affected memory address range will operate in write-through mode. After completion of step 330, method 300 may proceed to step 334.

At step 332, in response to a determination that information handling system 102 may be reconfigured to reduce the energy $E_{flush}$ needed to flush cache 108, BIOS 105 and/or management controller 106 may reconfigure information handling system 102 to reduce the energy $E_{flush}$ needed to flush cache 108. After completion of step 332, method 300 may proceed again to step 308.

At step 334, information handling system 102 may finish booting and continue normal operation. After completion of step 334, method 300 may end.

In the event of a power event, power management components (e.g., management controller 106, PSU 110) of information handling system 102 may execute hold-up in accordance with the most-recent in-system cache flush measurement and characterization operation.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media.

In alternative embodiments, steps 308 through 324 may be repeated with varying conditions applied in step 310 to measure flush times for each set of conditions applied. In such embodiments, after determining the measurement results for each set of conditions required, steps 326 to 328 may be compared to the results of each loop pass, or may be compared to a statistical averaging or weighting of the loop pass results, in order to determine a supportable write-back cache configuration.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   a processor;
   a management controller communicatively coupled to the processor; and
   a basic input/output system comprising a program of instructions executable by the processor and configured to, during boot of the information handling system:
   initialize information handling resources of the information handling system for interoperability with the processor; and
   in concert with the management controller:
   determine a first amount of energy required by the information handling system to flush a cache integral to the information handling system to memory integral to the information handling system in response to a power loss of one or more power supplies for supplying electrical energy to the information handling system, wherein determining the first amount of energy includes modifying a portion of cache lines of the cache, performing a cache flush of the portion, and determining the first amount of energy based on an extrapolation of energy required to perform the cache flush and a size of the portion;
   determine whether a second amount of energy available for hold-up of the one or more power supplies in response to the power loss exceeds the first amount of energy; and
   responsive to determining whether the second amount of energy exceeds the first amount of energy, configure the cache, including enabling the cache for write back mode in response to a determination that the second amount of energy exceeds the first amount of energy.

2. The information handling system of claim 1, wherein determining the first amount of energy comprises:
   emulating the power loss; and
   during emulation of the power loss:
   measuring a time required to complete the cache flush of the cache;
   measuring an amount of power delivered by the one or more power supplies during the cache flush; and
   calculating the first amount of energy based on the time and the amount of power.

3. The information handling system of claim 1, wherein configuring the cache comprises enabling the cache for write through mode responsive to determining the first amount of energy exceeds the second amount of energy.

4. The information handling system of claim 1, wherein the basic input/output system is configured to, in concert with the management controller and responsive to determining the first amount of energy exceeds the second amount of energy:
   reconfigure the information handling system to a new configuration to reduce energy needed to flush the cache;
   re-determine the first amount of energy under the new configuration;
   determine whether the second amount of energy exceeds the first amount of energy under the new configuration; and
   responsive to determining whether the second amount of energy exceeds the first amount of energy under the new configuration, configure the cache.

5. A method comprising, during boot of an information handling system in concert with a management controller:
   determining a first amount of energy required by the information handling system to flush a cache integral to the information handling system to memory integral to the information handling system in response to a power loss of one or more power supplies for supplying electrical energy to the information handling system, wherein determining the first amount of energy includes modifying a portion of cache lines of the cache, performing a cache flush of the portion, and determining the first amount of energy based on an extrapolation of energy required to perform the cache flush and a size of the portion;
   determining whether a second amount of energy available for hold-up of the one or more power supplies in response to the power loss exceeds the first amount of energy; and responsive to determining whether the second amount of energy exceeds the first amount of energy, configuring the cache, including enabling the cache for write back mode in response to a determination that the second amount of energy exceeds the first amount of energy.

6. The method of claim 5, wherein determining the first amount of energy comprises:
emulating the power loss; and
during emulation of the power loss:
measuring a time required to complete the cache flush of the cache;
measuring an amount of power delivered by the one or more power supplies during the cache flush; and
calculating the first amount of energy based on the time and the amount of power.

7. The method of claim 5, wherein configuring the cache comprises enabling the cache for write through mode responsive to determining the first amount of energy exceeds the second amount of energy.

8. The method of claim 5, further comprising, responsive to determining the first amount of energy exceeds the second amount of energy:
reconfiguring the information handling system to a new configuration to reduce energy needed to flush the cache;
re-determining the first amount of energy under the new configuration;
determining whether the second amount of energy exceeds the first amount of energy under the new configuration; and
responsive to determining whether the second amount of energy exceeds the first amount of energy under the new configuration, configuring the cache.

9. An article of manufacture comprising:
a non-transitory computer-readable medium; and
computer-executable instructions carried on the computer-readable medium, the instructions readable by a processor, the instructions, when read and executed, for causing the processor to, during boot of an information handling system and in concert with a management controller of the information handling system:
determine a first amount of energy required by the information handling system to flush a cache integral to the information handling system to memory integral to the information handling system in response to a power loss of one or more power supplies for supplying electrical energy to the information handling system, wherein determining the first amount of energy includes modifying a portion of cache lines of the cache, performing a cache flush of the portion, and determining the first amount of energy based on an extrapolation of energy required to perform the cache flush and a size of the portion;
determine whether a second amount of energy available for hold-up of the one or more power supplies in response to the power loss exceeds the first amount of energy; and
responsive to determining whether the second amount of energy exceeds the first amount of energy, configure the cache, including enabling the cache for write back mode in response to a determination that the second amount of energy exceeds the first amount of energy.

10. The article of claim 9, wherein determining the first amount of energy comprises:
emulating the power loss; and
during emulation of the power loss:
measuring a time required to complete the cache flush of the cache;
measuring an amount of power delivered by the one or more power supplies during the cache flush; and
calculating the first amount of energy based on the time and the amount of power.

11. The article of claim 9, wherein configuring the cache comprises enabling the cache for write through mode responsive to determining the first amount of energy exceeds the second amount of energy.

12. The article of claim 9, wherein the instructions further cause the processor to, responsive to determining the first amount of energy exceeds the second amount of energy:
reconfigure the information handling system to a new configuration to reduce energy needed to flush the cache;
re-determine the first amount of energy under the new configuration;
determine whether the second amount of energy exceeds the first amount of energy under the new configuration; and
responsive to determining whether the second amount of energy exceeds the first amount of energy under the new configuration, configure the cache.

* * * * *